United States Patent
Parida et al.

(10) Patent No.: US 12,298,579 B2
(45) Date of Patent: May 13, 2025

(54) UNBONDED ARMORED OPTICAL FIBRE CABLE

(71) Applicant: Sterlite Technologies Limited, Gurugram (IN)

(72) Inventors: Jyotiprakash Parida, Gurugram (IN); Pramod Marru, Gurugram (IN); Aparna Nath, Gurugram (IN)

(*) Notice: Subject to any disclaimer, the term of this patent is extended or adjusted under 35 U.S.C. 154(b) by 0 days.

(21) Appl. No.: 17/705,347

(22) Filed: Mar. 27, 2022

(65) Prior Publication Data
US 2023/0185043 A1 Jun. 15, 2023

(30) Foreign Application Priority Data
Dec. 10, 2021 (IN) .............................. 202111057627

(51) Int. Cl.
*G02B 6/44* (2006.01)
(52) U.S. Cl.
CPC ......... *G02B 6/4435* (2013.01); *G02B 6/4488* (2013.01)
(58) Field of Classification Search
CPC .................................................. G02B 6/4435
See application file for complete search history.

(56) References Cited

U.S. PATENT DOCUMENTS

| 5,751,879 | A * | 5/1998 | Graham | G02B 6/4479 |
| | | | | 385/103 |
| 11,249,272 | B2 * | 2/2022 | Sato | G02B 6/4409 |
| 2004/0001682 | A1* | 1/2004 | Beuth | G02B 6/02033 |
| | | | | 385/128 |
| 2014/0341518 | A1* | 11/2014 | Kimura | G02B 6/443 |
| | | | | 385/102 |

FOREIGN PATENT DOCUMENTS

| CN | 113314265 A | * | 8/2021 | ............. G02B 6/443 |
| EP | 0518523 B1 | * | 5/1992 | |
| EP | 1591816 A1 | * | 11/2005 | ........... G01M 11/086 |

* cited by examiner

*Primary Examiner* — Chris H Chu
(74) *Attorney, Agent, or Firm* — Steven R. Fairchild

(57) ABSTRACT

The present invention relates to an optical fibre cable (100) and the method of manufacturing thereof. In particular, the optical fibre cable (100) comprises a plurality of optical fibres (102), one or more layers (104) enveloping the plurality of optical fibres (102), a metallic layer (108) surrounding one or more layers (104), an outer sheath (112), and a separation layer (110) sandwiched between the metallic layer (108) and the outer sheath (112). Particularly, binding between the metallic layer (108) and the separation layer (110) is defined as metal binding and binding between the separation layer (110) and the outer sheath (112) is defined as sheath binding. Further, the metal binding is less than the sheath binding.

18 Claims, 5 Drawing Sheets

UNBONDED ARMORED OPTICAL FIBRE CABLE

FIELD OF THE INVENTION

Embodiments of the present invention relate to the field of optical fiber cables and more particularly, relate to an unbonded armored optical fibre cable and the manufacturing method thereof.

BACKGROUND

Communications networks are used to convey a variety of signals such as voice, video, data and the like to subscribers. With the advancement of science and technology, various modern technologies are being employed for communication purposes. One of the most important modern communication technologies is the optical fiber communication technology using a variety of optical fiber cables. Optical communication networks employ optical fibers to carry optical data signals.

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core nc is typically greater than the refractive index of the optical cladding ng (i.e., nc>ng).

One such type of optical fiber cables is an armored optical fiber cable. Armored fiber optic (optical cables) wraps "armor" of protective exactly again in the outside of optical fiber and is mainly used in satisfying the requirements such as client's mouse bite preventing, moisture proof. Armored fiber optic has important application in telecommunication optical fiber intercity line, a secondary primary transmission. These armored optical fiber cables are surrounded by a steel or aluminium jacket which is then covered with a polyethylene jacket to protect it from moisture and abrasion. The armored optical fibre cables may be installed in ducts or placed in underground enclosures with special protection from dirt and clay intrusion.

WIPO patent application no. WO2004083928A1 titled "Dual stage fiber optic cable design" discloses a fiber optic cable having one or more optical fibers, an inner tube surrounding the optical fibers, a strength member, an inner jacket surrounding the inner tube and strength member, and an outer jacket surrounding the inner jacket without being adhered to the inner jacket such that the outer jacket is easily strippable from the inner jacket. In particular, the inner jacket is constructed of a flexible, flame-resistant material such as braided glass fibers, while the outer jacket may be constructed of a stiffer, flame retardant material such as polyvinyl chloride.

US patent application no. US2009274426A1 titled "Fiber optic cable and method of manufacturing the same" discloses a fiber optic cable that includes at least one optical fiber and a protective layer generally disposed about the optical fiber. In particular, the cable jacket surrounds an outer surface of the protective layer, and a control layer is interposed between a portion of the protective layer and a portion of the cable jacket. Moreover, the control layer includes one or more apertures extending there through, thereby creating a predetermined bond between the protective layer and the cable jacket. By way of example, the protective layer is an armor layer, buffer tube, or other suitable cable component where a predetermined bond to the cable jacket is desired so the craft can easily remove a portion of the cable jacket. Further, the plurality of apertures can have any suitable size, shape, and/or arrangement for influencing the desired bond strength. Additionally, a method of manufacturing the fiber optic cable is also disclosed.

Chinese patent application no. CN101726814B titled "Armored fiber optic assemblies and methods of making the same" discloses armored fiber optic assemblies including a dielectric armor along with methods for manufacturing the same. In particular, the dielectric armor has an armor profile, thereby resembling conventional metal armored cable to the craft.

US patent application no. US20110075979A1 titled "Armored optical fiber cable" discloses an armored optical fiber cable that may include a core cable portion and an armored cable portion surrounding the core cable portion. Particularly, the core cable portion may include, among other layers, a steel tape layer wrapped around an insulation layer surrounding a conductive sheath. Moreover, the steel tape layer improves armored resistance to dragging and abrasion caused by fishing gear by protecting the insulation layer surrounding the sheath.

However, there are a few drawbacks in the currently similar technologies for manufacturing armored optical fibre cables. The protection provided by the existing armored cables from the dragging and abrasion of fishing gear is limited due to the loose nature of the armor components. Moreover, it is difficult and improper to remove the sheath in the current armored optical fibre cables due to the bonding between the sheath and the steel tape. Furthermore, as the optical fiber inside the sheath is fragile and easily damaged as is known from the material and characteristics of the optical fiber itself, the worker needs an extremely delicate operation process when performing sheath stripping of the armored optical fibre cables.

Accordingly, to overcome the disadvantages of the prior art, there is an urgent need for a technical solution that overcomes the above-stated limitations in the prior arts. The present invention focuses on preventing the bonding between the sheath and the steel tape in the armored optical fibre cables.

SUMMARY

Embodiments of the present invention relate to an optical fibre cable comprising a plurality of optical fibres, one or more layers enveloping the plurality of optical fibres, a metallic layer surrounding one or more layers, an outer sheath, and a separation layer. In particular, the outer sheath has a first melting point. Moreover, the separation layer is sandwiched between the metallic layer and the outer sheath. Furthermore, the binding between the metallic layer and the separation layer is defined as metal binding. Further, the binding between the separation layer and the outer sheath is defined as sheath binding. Additionally, the metal binding is less than the sheath binding.

In accordance with an embodiment of the present invention, the sheath binding is more than 70% of total binding.

In accordance with an embodiment of the present invention, the metal binding is less than 20% of total binding.

In accordance with an embodiment of the present invention, one or more layers corresponds to at least one of tight buffer units, central buffer tube, a plurality of buffer tubes, binder element, water blocking tape, aramid yarns.

In accordance with an embodiment of the present invention, the optical fibre cable comprises a central strength member.

In accordance with an embodiment of the present invention, at least a first portion of the separation layer has a melting point within the tolerance range of around 10% of the first melting point. In particular, at least a second portion of the separation layer has a melting point of at least 50% greater than the first melting point.

In accordance with an embodiment of the present invention, the separation layer comprises a first separation layer (F1) corresponding to at least a first portion of the separation layer. In particular, the first separation layer (F1) binds to the outer sheath.

In accordance with an embodiment of the present invention, the first separation layer (F1) and the outer sheath has a melting point of less than 150° C.

In accordance with an embodiment of the present invention, the separation layer comprises a second separation layer (F2) corresponding to a second portion of the separation layer. In particular, the second separation layer (F2) does not bind to the metallic layer.

In accordance with an embodiment of the present invention, the second separation layer (F2) has a melting point of at least 250° C.

In accordance with an embodiment of the present invention, the separation layer (110) comprises a first separation layer (F1) and a second separation layer (F2). In particular, the first separation layer (F1) and the second separation layer (F2) are bonded together.

In accordance with an embodiment of the present invention, the separation layer has a thickness of more than 20 microns.

In accordance with an embodiment of the present invention, the separation layer comprises a first separation layer (F1) and a second separation layer (F2). In particular, the first separation layer (F1) has a thickness in range of about 10-30 microns. Moreover, the second separation layer (F2) has a thickness in range of about 8-30 microns.

In accordance with an embodiment of the present invention, the metallic layer is surrounded by a film. In particular, the film is applied around the metallic layer with an overlap of at least 10% of width of the film.

Another embodiment of the present invention relates to a method of manufacturing an optical fibre cable. In particular, the method comprises the steps of paying off a core comprising a plurality of optical fibres, wrapping a metallic layer around the plurality of optical fibres, wrapping a separation layer around the metallic layer and extruding an outer sheath surrounding the separation layer. Moreover, the separation layer substantially binds with the outer sheath and remains substantially un-bonded with the metallic layer.

The foregoing objectives of the present invention are attained by employing an unbonded armored optical fibre cable and the manufacturing method thereof.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

Figure 1:
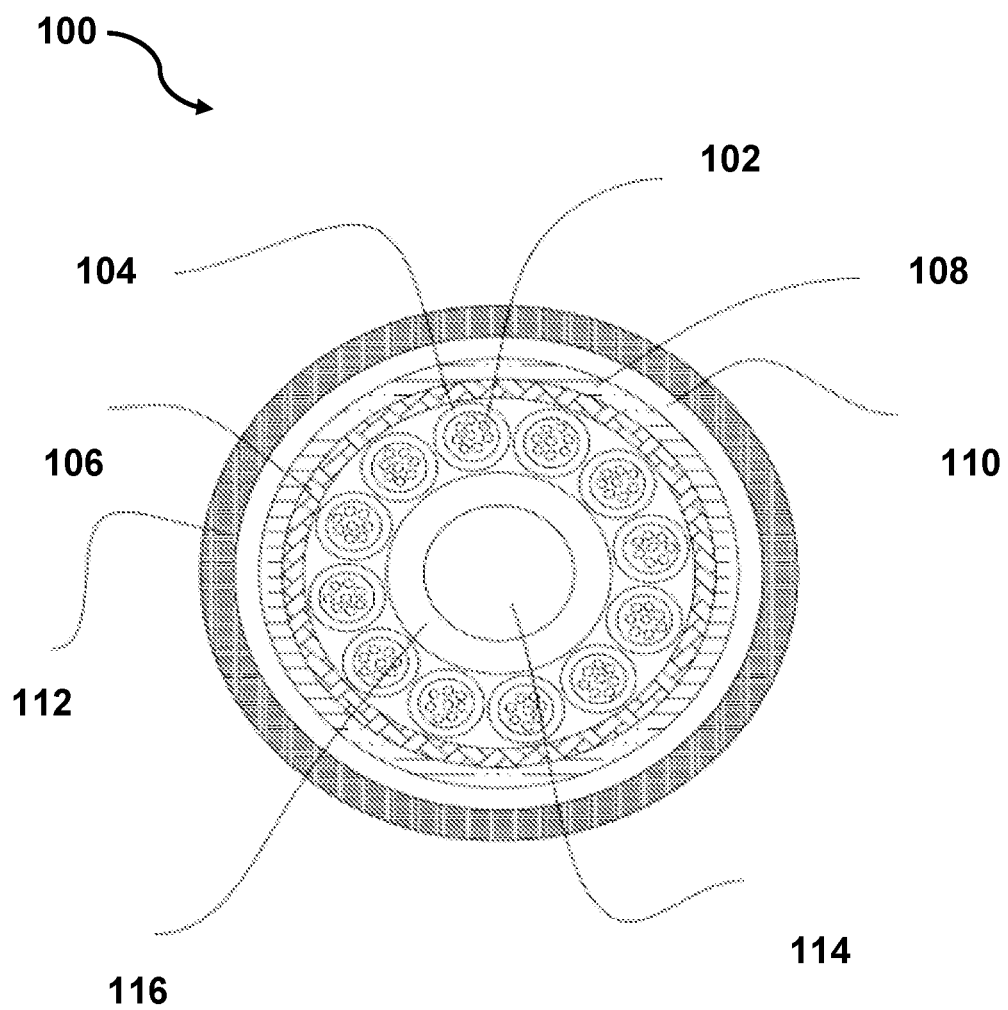
FIG. 1 is a pictorial snapshot illustrating an optical fibre cable in accordance with one embodiment of the present invention.

The optical fiber cable is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION

The principles of the present invention and their advantages are best understood by referring to FIG. 1 to FIG. 5. In the following detailed description, numerous specific details are set forth in order to provide a thorough understanding of the embodiment of the invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

FIG. 1 is a pictorial snapshot illustrating an optical fibre cable 100 in accordance with one embodiment of the present invention. In particular, the optical fibre cable 100 comprises a plurality of optical fibres 102, one or more retaining elements 104, a blocking layer 106, a metallic layer 108, the separation layer 110, and an outer sheath 112. Moreover, the optical fibre cable 100 comprises a central strength member 114 surrounded by a polyethylene up coating layer 116.

In accordance with an embodiment of the present invention, the plurality of optical fibres 102 are placed inside a core of the optical fibre cable 100. In particular, the core is the innermost part of the optical fibre cable 100. Moreover, the plurality of optical fibres 102 are surrounded by one or more retaining elements 104. Furthermore, one or more retaining elements 104 envelops one or more optical fibres 102. Furthermore, one or more retaining elements 104 is at least one of a tight buffer unit, a single buffer tube, a plurality of buffer tubes, a binder element, a water blocking tape and an aramid yarn. Further, one or more retaining elements 104 is surrounded by the metallic layer 108. Additionally, the plurality of optical fibers 102 may be in the form of plurality of intermittently bonded ribbons.

In accordance with an embodiment of the present invention, the metallic layer 108 surrounds one or more retaining elements 104. In case the blocking layer 106 is present, the metallic layer 108 surrounds the blocking layer 106. Moreover, the metallic layer 108 has a tensile strength of more than 350 mega Pascals. The tensile strength of the metallic layer 108 may vary. Furthermore, the metallic layer 108 has a breaking elongation of more than 20 percent. The breaking elongation of the metallic layer 108 may vary.

Further, the metallic layer 108 is surrounded by a separation layer 110. Particularly, the separation layer is applied around the metallic layer 108 with an overlap of at least 10% of width of the film. Further, the separation layer is a dual layer thin film that prevents bonding between the outer sheath 112 and the metallic layer 108.

In an exemplary example, the metallic layer 108 is any one of a steel tape, a corrugated steel tape and an ECCS (Electro Chrome coated Steel) tape.

Further, the separation layer is made of a combination of polyethylene and polyethylene terephthalate layers.

Further, the outer sheath 112 prevents the optical fibre cable 100 from external pressures and environmental conditions. The environmental conditions include but may not be limited to rainfall, sunlight, wind, and snowfall. Additionally, the outer sheath 112 has a first melting point.

In accordance with an embodiment of the present invention, the optical fibre cable 100 comprises the separation layer 110. In particular, the separation layer 110 is sandwiched between the metallic layer 108 and the outer sheath 112. Binding between the metallic layer 108 and the separation layer 110 is defined as metal binding and binding between the separation layer 110 and the outer sheath 112 is defined as sheath binding. Moreover, the metal binding is less than the sheath binding. Furthermore, the sheath binding is more than 70% of total binding. Further, the metal binding is less than 20% of total binding.

Figure 2:
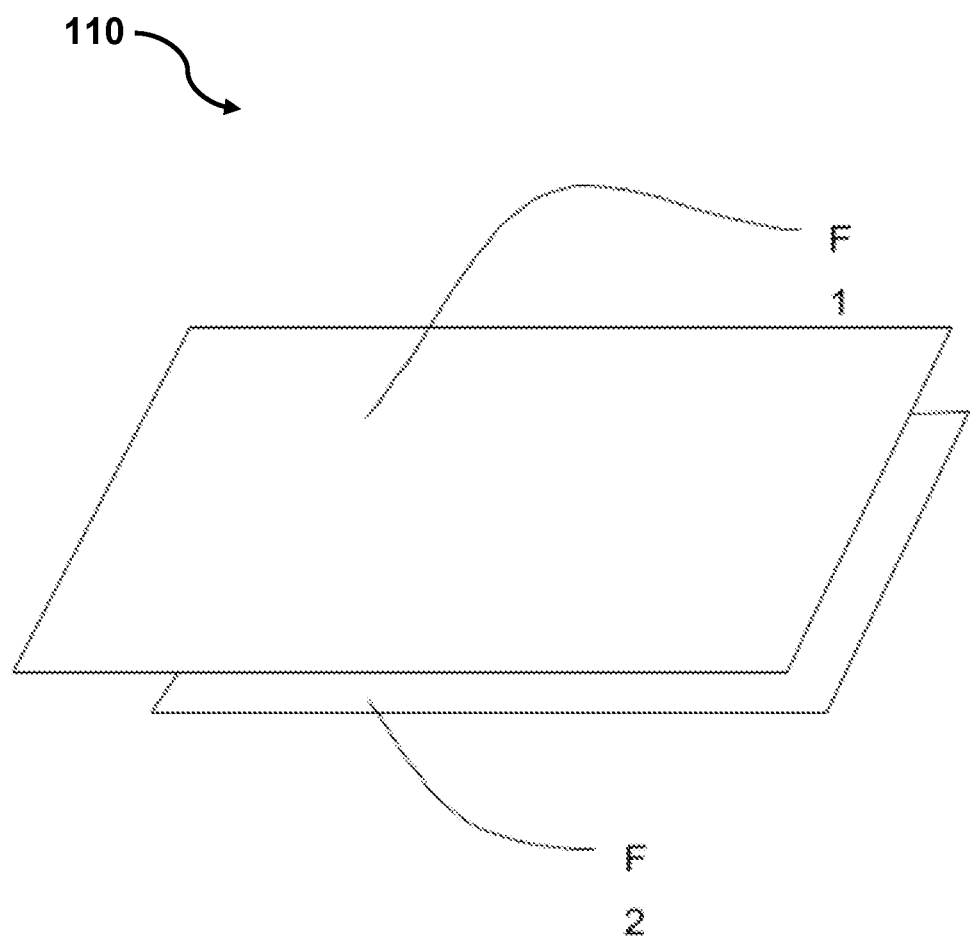
FIG. 2 is a pictorial snapshot illustrating a separation layer of the optical fibre cable in accordance with one embodiment of the present invention.

The sheath binding may be calculated as:

Sheath binding=Internal surface area of the outer sheath sticking to the separation layer*100/Total internal surface area of the outer sheath The metal binding may be calculated as:

Metal binding=Internal surface area of the separation layer sticking to the inner layer*100/Total internal surface area of the separation layer FIG. 2 is a pictorial snapshot illustrating a separation layer 110 of the optical fibre cable 100 in accordance with one embodiment of the present invention. In particular, the separation layer 110 includes a first separation layer F1 and a second separation layer F2. Moreover, the first separation layer F1 and the second separation layer F2 are bonded together using an adhesive. Furthermore, the first separation layer F1 is made of polyolefin material. Further, the second separation layer F2 is made of polyester material.

In an exemplary example, polyolefin material of the first separation layer F1 is polyethylene.

In an exemplary example, polyester material of the second separation layer F2 is polyethylene terephthalate.

Further, the first separation layer F1 is placed in contact with the outer sheath 112 and the second separation layer F2 is placed in contact with the metallic layer 108. Additionally, the first separation layer F1 and the second separation layer F2 allows easy removal or stripping of the outer sheath 112.

In accordance with an embodiment of the present invention, the first separation layer F1 corresponds to at least a first portion of the separation layer 110. In particular, the first separation layer F1 binds to the outer sheath 112. Moreover, the first portion of the separation layer 110 has a melting point within the tolerance range of around 10% of the first melting point. Furthermore, the tolerance range of around 10% allows the first separation layer F1 to get partially melted during extrusion of the outer sheath 112 and binds with the outer sheath 112.

In accordance with an embodiment of the present invention, the second separation layer F2 corresponds to a second portion of the separation layer 110. In particular, the second portion of the separation layer 110 has a melting point of at least 50% greater than the first melting point. Moreover, the melting point of at least 50% greater than the first melting point of the outer sheath 112 prevents melting and binding of the second separation layer F2 with the outer sheath 112. Furthermore, the second separation layer F2 does not bind to the metallic layer 108. Further, the second separation layer F2 has a melting point of at least 250° C.

In accordance with an embodiment of the present invention, the separation layer 110 has a thickness of more than 20 microns. The thickness of the separation layer 110 may vary. In particular, the first separation layer F1 has a thickness in range of about 10-30 microns. The thickness of the first separation layer F1 may vary. Moreover, the second separation layer F2 has a thickness in range of about 8-30 microns. The thickness of the second separation layer F2 may vary. Furthermore, the separation layer 110 is wrapped with overlapping ends over the entire length of the optical fibre cable 100.

Figure 3:
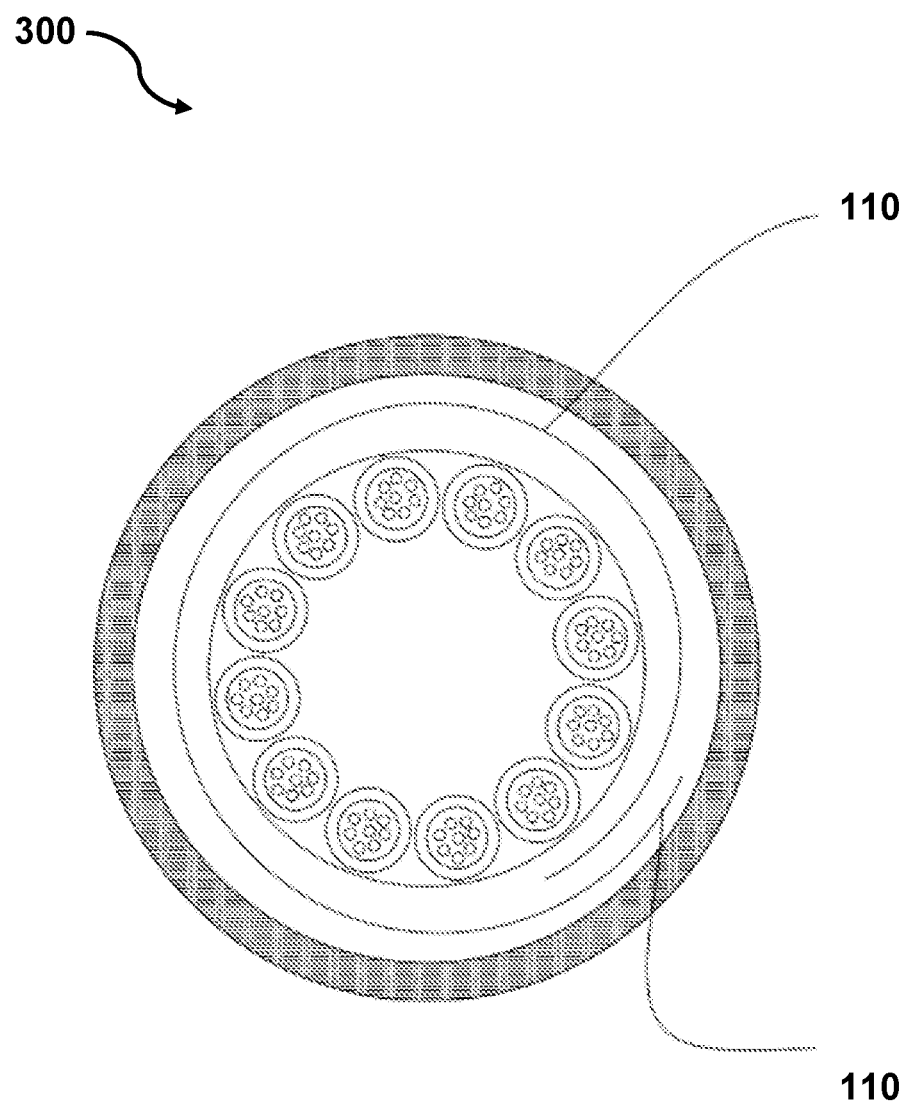
FIG. 3 is a pictorial snapshot illustrating a close view of the separation layer inside the optical fibre cable in accordance with one embodiment of the present invention.

FIG. 3 is a pictorial snapshot illustrating a close view of the separation layer inside the optical fibre cable in accordance with one embodiment of the present invention. In particular, the separation layer 110 overlaps along a longitudinal direction of the optical fibre cable 100. Moreover, the overlapping between two ends of the separation layer 110 is minimum 10% of width of the separation layer 110.

In an exemplary example, if width of the separation layer 110 is 32 millimeters for the optical fibre cable 100 having 144 optical fibres along with cable diameter of about 14.5 millimeters, the minimum overlap would be 3.2 millimeters.

Further, the overlapping completely eliminates chances of bonding between the metallic layer 108 and the outer sheath 112 around ends of the film.

In accordance with an embodiment of the present invention, the optical fibre cable 100 may include the central strength member 114. In particular, the central strength member 114 may or may not be surrounded by polyethylene up-coating layer 116. Alternatively, the optical fibre cable 100 may not include the central strength member 114.

In accordance with an embodiment of the present invention, the optical fibre cable 100 is an unbonded armored cable. In particular, the armored optical fibre cable provides extra protection without sacrificing flexibility or functionality within fiber networks, featuring more robust and reliable when encountered with rodents, moisture, and the like.

Figure 4:
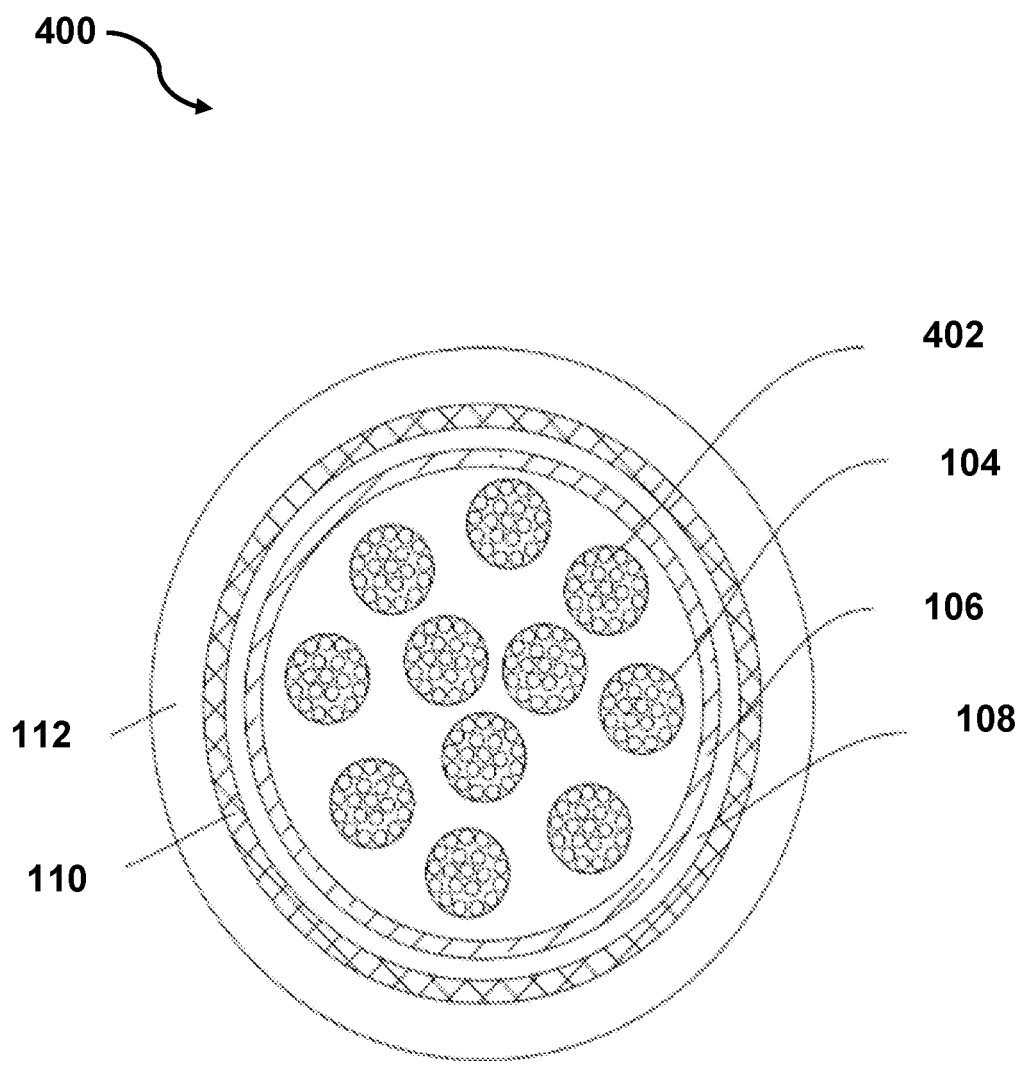
FIG. 4 is a cross-sectional view illustrating an intermittently bonded ribbon cable in accordance with one embodiment of the present invention.

FIG. 4 is a cross-sectional view illustrating an intermittently bonded ribbon cable 400 in accordance with one embodiment of the present invention. In particular, the intermittently bonded ribbon cable 400 comprises a plurality of intermittently bonded ribbons 402, one or more layers 104, the blocking layer 106, the metallic layer 108, the separation layer 110, and the outer sheath 112.

In accordance with an embodiment of the present invention, each of one or more layers 104 comprises the plurality of intermittently bonded ribbons 402.

In accordance with an embodiment of the present invention, number of one or more layers 104 may vary.

In accordance with an embodiment of the present invention, number of the plurality of intermittently bonded ribbons 402 of each of one or more layers 104 may vary.

In accordance with an embodiment of the present invention, the plurality of intermittently bonded ribbons 402 comprises the plurality of optical fibres 102.

In accordance with an embodiment of the present invention, number of the plurality of optical fibres 102 in each of the plurality of intermittently bonded ribbons 402 is 12.

In accordance with an embodiment of the present invention, number of the plurality of optical fibres 102 may vary.

Figure 5:
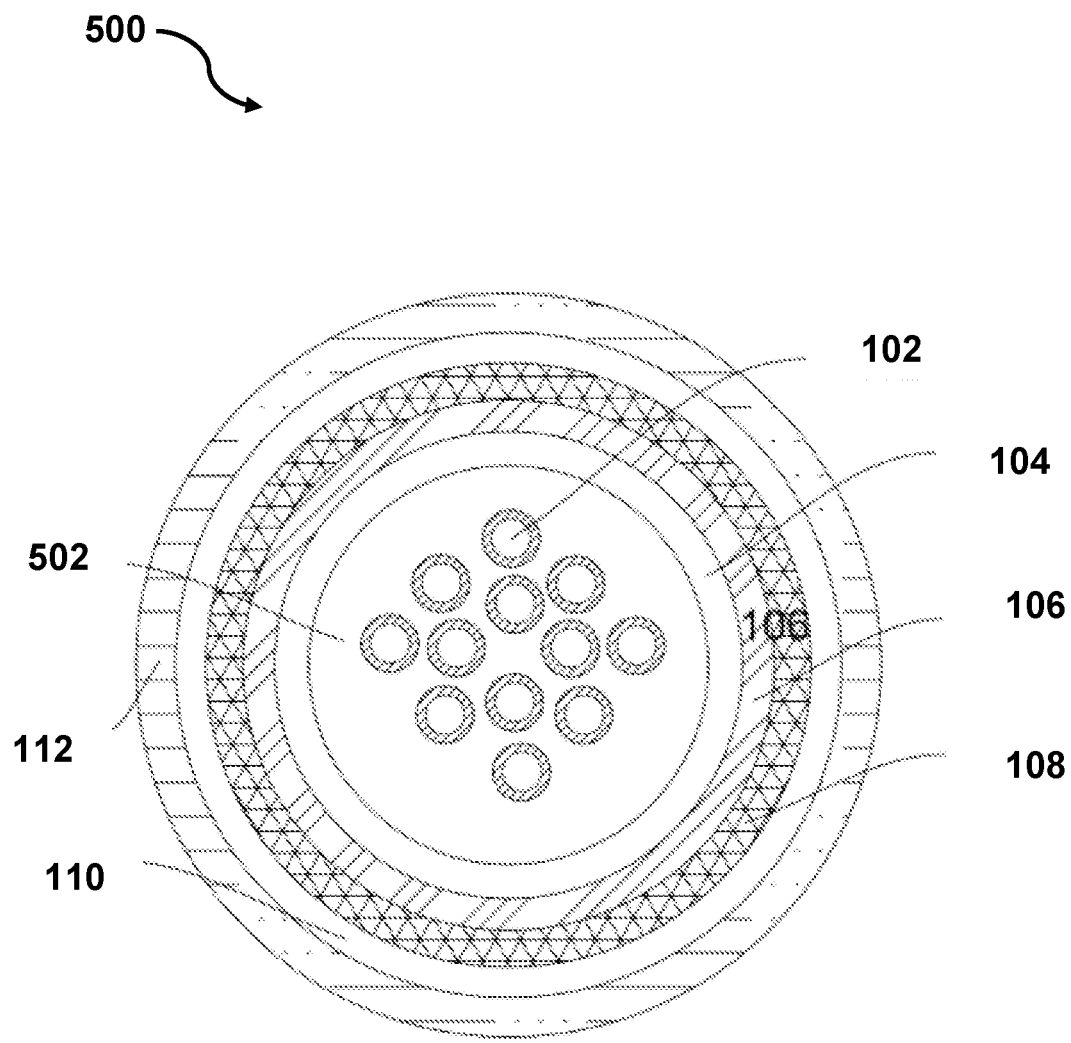
FIG. 5 is a cross-sectional view illustrating a unitube optical fiber cable in accordance with one embodiment of the present invention.

FIG. 5 is a cross-sectional view illustrating a unitube optical fiber cable 500 in accordance with one embodiment of the present invention. In particular, the unitube optical fiber cable 500 comprises the plurality of optical fibers 102, one or more layers 104, the blocking layer 106, a metallic layer 108 and the separation layer 110. Moreover, the unitube optical fiber cable 500 comprises the outer sheath 112 and a gel 502. Furthermore, one or more layers 104 comprises a unitube or a single buffer tube which encloses the plurality of optical fibers 102.

In accordance with an embodiment of the present invention, the plurality of optical fibers 102 is positioned inside a core of the unitube optical fiber cable 500. In particular, the plurality of optical fibers 102 is substantially placed along a longitudinal axis of the unitube optical fiber cable 500 inside one or more layers 104. Moreover, each of the plurality of optical fibers 102 is a fiber used for transmitting information as light pulses from one end to another. Furthermore, each of the plurality of optical fibers 102 is a thin strand of glass capable of transmitting optical signals. Furthermore, each of the plurality of optical fibers 102 is configured to transmit large amounts of information over long distances with relatively low attenuation.

Further, each of the plurality of optical fibers 102 includes a core region and a cladding region. The core region is an inner part of an optical fiber and the cladding section is an outer part of the optical fiber. Additionally, the core region is defined by a central longitudinal axis of each of the plurality of optical fibers 102. And the cladding region surrounds the core region.

In accordance with an embodiment of the present invention, each of the plurality of optical fibers 102 has a diameter of about 250 microns.

In accordance with an embodiment of the present invention, the diameter of the plurality of optical fibers 102 is in a range of 200 microns or less.

In accordance with an embodiment of the present invention, the diameter of the plurality of optical fibers 102 may vary.

In accordance with an embodiment of the present invention, each of the plurality of optical fibers 102 is a single mode fiber.

In accordance with an embodiment of the present invention, each of the plurality of optical fibers 102 is a multimode fiber.

In accordance with an embodiment of the present invention, the unitube optical fiber cable 500 comprises the gel 502. In particular, the gel 502 is filled inside the core of one or more layers 104 and around the plurality of optical fibers 102. Moreover, the gel 502 is a thixotropic gel. Furthermore, the thixotropic gel prevents ingression of water inside the core of the unitube optical fiber cable 500.

In accordance with an embodiment of the present invention, the gel 502 may be replaced by any other type of water blocking elements.

In accordance with an embodiment of the present invention, optical fibre cable 100 is manufactured by a process. The process includes a first step of paying off the core of the optical fibre cable 100. In particular, the core includes the plurality of optical fibres 102. Moreover, the core of the optical fibre cable 100 may be tubeless, unitube, multitube or inner sheath core. Further, the core may be surrounded by the blocking layer 106 before applying the metallic layer 108. Subsequently, the blocking layer 106 corresponds to at least one of water blocking tape, aramid yarns, water swellable yarns or any other suitable layer.

The second step is wrapping the metallic layer 108 around the blocking layer 106 of the optical fiber cable 100. And the third step is wrapping the separation layer 110 around the metallic layer 108. The fourth step of extruding the outer sheath 112 surrounding the separation layer 110. The separation layer 110 substantially binds with the outer sheath 112 and remains substantially un-bonded with the metallic layer 108. The separation layer 110 binds with the outer sheath 112 during extrusion. The separation layer 110 comes out bonded with the outer sheath 112 when the outer sheath 112 is ripped during installation. So, there is no need to remove the separation layer 110 separately. On removal of the outer sheath 112, the separation layer 110 is also removed along with the outer sheath 112. The method is not limited to the above-mentioned steps.

The present invention of the unbonded armored optical fibre cable 100 and the manufacturing method thereof obtained by the proposed invention advantageously provides an unbonded armored optical fibre cable 100. In particular, the bonding between the outer sheath 112 and the metallic layer 108 in the optical fibre cable 100 is prevented.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. An optical fibre cable (100) comprising:
   a plurality of optical fibres (102);
   one or more layers (104) enveloping the plurality of optical fibres (102);
   a metallic layer (108) surrounding the one or more layers (104);
   an outer sheath (112), wherein the outer sheath has a first melting point; and
   a separation layer (110), wherein the separation layer is sandwiched between the metallic layer (108) and the outer sheath (112), wherein binding between the metallic layer (108) and the separation layer (110) is defined as metal binding;
   wherein the separation layer (110) comprises of a first layer (F1) in contact with the outer sheath (112) and a second layer (F2) in contact with metallic layer (108) wherein the melting point of first layer (F1) is less than the melting point of the second layer (F2);
   wherein the first layer (F1) and the second layer (F2) are made of non-metallic materials.

2. The optical fibre cable (100) as claimed in claim 1, wherein binding between the separation layer (110) and the outer sheath (112) is defined as sheath binding, wherein the metal binding is less than the sheath binding.

3. The optical fibre cable (100) as claimed in claim 1, wherein the sheath binding is more than 70% of total binding.

4. The optical fibre cable (100) as claimed in claim 1, wherein the metal binding is less than 20% of total binding.

5. The optical fibre cable (100) as claimed in claim 1, wherein the one or more layers (104) corresponds to at least one of tight buffer units, central buffer tube, a plurality of buffer tubes, binder element, water blocking tape, aramid yarns.

6. The optical fibre cable (100) as claimed in claim 1, further comprising a central strength member (114).

7. The optical fibre cable (100) as claimed in claim 1, wherein at least a first portion of the separation layer (110) has a melting point within the tolerance range of around 10% of the first melting point.

8. The optical fibre cable (100) as claimed in claim 7, wherein the first separation layer (F1) and the outer sheath (112) has a melting point of less than 150° C.

9. The optical fibre cable (100) as claimed in claim 1, wherein at least a second portion of the separation layer (110) has a melting point of at least 50% greater than the first melting point.

10. The optical fibre cable (100) as claimed in claim 1, wherein the separation layer (110) comprises a first separation layer (F1) corresponding to at least a first portion of the separation layer (110).

11. The optical fibre cable (100) as claimed in claim 10, wherein the second separation layer (F2) has a melting point of at least 250° C.

12. The optical fibre cable (100) as claimed in claim 1, wherein the first separation layer (F1) binds to the outer sheath (112).

13. The optical fibre cable (100) as claimed in claim 1, wherein the separation layer (110) comprises a second separation layer (F2) corresponding to a second portion of the separation layer.

14. The optical fibre cable (100) as claimed in claim 1, wherein the second separation layer (F2) does not bind to the metallic layer.

15. The optical fibre cable (100) as claimed in claim 1, wherein the first separation layer (F1) and the second separation layer (F2) are bonded together.

16. The optical fibre cable (100) as claimed in claim 1, wherein the separation layer (110) has a thickness of more than 20 microns.

17. The optical fibre cable (100) as claimed in claim 1, wherein the separation layer (110) comprises a first separation layer (F1) and a second separation layer (F2), wherein the first separation layer (F1) has a thickness in range of about 10-30 microns and the second separation layer (F2) has a thickness in range of about 8-30 microns.

18. The optical fibre cable (100) as claimed in claim 1, wherein the metallic layer (108) is surrounded by a film, wherein the film is applied around the metallic layer (108) with an overlap of at least 10% of width of the film.

* * * * *